(12) United States Patent
Ryu

(10) Patent No.: US 11,018,551 B2
(45) Date of Patent: May 25, 2021

(54) MOTOR

(71) Applicant: LG INNOTEK CO., LTD., Seoul (KR)

(72) Inventor: Woong Seon Ryu, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 0 days.

(21) Appl. No.: 16/878,905

(22) Filed: May 20, 2020

(65) Prior Publication Data

US 2020/0287441 A1 Sep. 10, 2020

Related U.S. Application Data

(63) Continuation of application No. 16/541,782, filed on Aug. 15, 2019, now Pat. No. 10,700,574, which is a
(Continued)

(30) Foreign Application Priority Data

Nov. 11, 2014 (KR) ........................ 10-2014-0156397

(51) Int. Cl.
*H02K 5/24* (2006.01)
*H02K 3/52* (2006.01)
(Continued)

(52) U.S. Cl.
CPC ................ *H02K 5/24* (2013.01); *H02K 1/12* (2013.01); *H02K 3/32* (2013.01); *H02K 3/50* (2013.01);
(Continued)

(58) Field of Classification Search
CPC ........... H02K 3/30; H02K 3/32; H02K 3/325; H02K 3/34; H02K 3/345; H02K 3/38;
(Continued)

(56) References Cited

U.S. PATENT DOCUMENTS

| 2008/0079101 A1 | 4/2008 | Ai |
| 2015/0333590 A1 | 11/2015 | Yoshida et al. |
| 2016/0111929 A1 | 4/2016 | Kessler et al. |

FOREIGN PATENT DOCUMENTS

| DE | 10-2013-003024 A1 | 8/2014 |
| EP | 2 624 415 A1 | 8/2013 |

(Continued)

OTHER PUBLICATIONS

Haga Hidehiro; Uda Takayuk; Aono Masato, Motor, Feb. 28, 2013, Nippon Densan Corp, JP 2013042633 (English Machine Translation) (Year: 2013) (Year: 2013).*
(Continued)

*Primary Examiner* — Quyen P Leung
*Assistant Examiner* — Alexander A Singh
(74) *Attorney, Agent, or Firm* — Saliwanchik, Lloyd & Eisenschenk

(57) ABSTRACT

Provided is a motor which includes a housing and a stator disposed in the housing and a rotor disposed in the stator and a busbar disposed on one side of the stator, wherein the stator includes a stator core and a coil wound around the stator core and an insulator disposed between the stator core and the coil, the insulator includes a first insulator and a second insulator wherein the busbar includes a guide, wherein the guide is disposed between a first insulator and a second insulator.

9 Claims, 7 Drawing Sheets

Related U.S. Application Data continuation of application No. 15/526,098, filed as application No. PCT/KR2015/012046 on Nov. 10, 2015, now Pat. No. 10,432,060.

(51) Int. Cl.
*H02K 3/50* (2006.01)
*H02K 3/32* (2006.01)
*H02K 1/12* (2006.01)

(52) U.S. Cl.
CPC ......... *H02K 3/522* (2013.01); *H02K 2203/09* (2013.01); *H02K 2203/12* (2013.01)

(58) Field of Classification Search
CPC .. H02K 2203/12; H02K 2203/09; H02K 3/50; H02K 3/505; H02K 3/51; H02K 3/52; H02K 3/521; H02K 3/522; H02K 5/24; H02K 1/12
USPC .......................................... 310/214, 215, 71
See application file for complete search history.

(56) References Cited

FOREIGN PATENT DOCUMENTS

| | | | |
|---|---|---|---|
| JP | 09-312948 A | | 12/1997 |
| JP | 09312948 A | * | 12/1997 |
| JP | 10-070871 A | | 3/1998 |
| JP | 2010-028889 A | | 2/2010 |
| JP | 2010-104211 A | | 5/2010 |
| JP | 2013-042633 A | | 2/2013 |
| JP | 2013042633 A | * | 2/2013 |
| KR | 10-2012-0048316 A | | 5/2012 |
| WO | WO-2014/061276 A1 | | 4/2014 |

OTHER PUBLICATIONS

Sato Kimiharu, Stator of Dynamo-Electric Machine, Dec. 2, 1997, Toshiba Corp, JP 09-312948 (English Machine Translation) (Year: 1997) (Year: 1997).*
International Search Report in International Application No. PCT/KR2015/012046, filed Nov. 10, 2015.
Supplementary European Search Report dated Oct. 4, 2017 in European Application No. 15859982.9.
Non-Final Office Action dated Nov. 14, 2018 in U.S. Appl. No. 15/526,098.
Notice of Allowance dated May 16, 2019 in U.S. Appl. No. 15/526,098.
Haga, H. et al. "Motor", Feb. 28, 2013, Nippon Densan Corp, JP 2013-042633 (English Machine Translation) (Year: 2013).
Sato, K. "Stator of Dynamo-Electric Machine", Dec. 2, 1997, Toshiba Corp, JP 09-312948 (English Machine Translation) (Year: 1997).
Office Action dated Oct. 2, 2019 in U.S. Appl. No. 16/541,782.
Notice of Allowance dated Feb. 21, 2020 in U.S. Appl. No. 16/541,782.

* cited by examiner

MOTOR

CROSS-REFERENCE TO RELATED APPLICATIONS

This application is a continuation of U.S. application Ser. No. 16/541,782, filed Aug. 15, 2019; which is a continuation of U.S. application Ser. No. 15/526,098, filed May 11, 2017, now U.S. Pat. No. 10,432,060, issued Oct. 1, 2019, which is the U.S. national stage application of International Patent Application No. PCT/KR2015/012046, filed Nov. 10, 2015, which claims priority to Korean Patent Application No. 10-2014-0156397, filed Nov. 11, 2014, the disclosures of each of which are incorporated herein by reference in their entirety.

BACKGROUND

1. Field of the Invention

The Present Invention Relates to a Motor, and More Particularly, to a Motor Including a busbar connecting coils connected in parallel to a stator.

2. Discussion of Related Art

A motor includes a shaft formed to be rotatable, a rotor coupled to the shaft, and stators fixed inside a housing. The stators are installed along a circumference of the rotor at regular intervals. Coils that form a rotating magnetic field are wound around the stators to induce electrical interaction with the rotor and induce the rotor to rotate.

A busbar electrically connected to the coils is disposed on an upper end of the stator. The busbar generally includes a ring-shaped busbar body and terminals formed on the busbar body to be connected to the coils.

The coils and the terminals are generally fused to be connected to each other, and thus problems in that coatings of the coils are worn due to vibration in an environment with strong vibration or connection terminals of the coils are cut may occur.

A major cause of the problems is movement of the busbar due to vibration. A solution to inhibit movement of the busbar is impregnation or molding of a wire. However, the solution has problems in that an additional process is needed and management and manufacturing costs are increased.

SUMMARY OF THE INVENTION

The present invention is directed to a motor capable of inhibiting a coating of coil from being worn or cut by inhibiting a busbar from moving without an additional process or component.

The scope of the present invention is not limited to the above-described objects, and other unmentioned objects may be clearly understood by those skilled in the art from the following descriptions.

According to an aspect of the present invention, there is provided a motor comprising a motor comprising a housing and a stator disposed in the housing and a rotor disposed in the stator and a busbar disposed on one side of the stator, wherein the stator includes a stator core, a coil wound around the stator core and an insulator disposed between the stator core and the coil, the insulator includes a first insulator, a second insulator, wherein the busbar includes a guide, wherein the guide is disposed between a first insulator and a second insulator.

The guide are provided as a plurality of guides, the plurality of guides is disposed between a first insulator and a second insulator each.

The insulator includes a slot is disposed between adjacent the guide, and the upper end of insulator is disposed in the slot.

The upper end of insulator is in contact with an side surface of the guide.

A length of the guide in an axial direction is greater than a length a region of the upper end of insulator which is in contact with the inner circumferential surface of the busbar in an axial direction.

The busbar includes a short protrusion that protrudes from the inner circumferential surface thereof to connect a plurality of guides and the short protrusion is in contact with the upper surface of the insulator.

A position of the busbar is determined due to the upper surface of the insulator in contact with the lateral surface of the guide.

The insulator includes an outer circumferential part that faces the housing, an inner circumferential part that faces the rotor and an extension part that protrudes from the inner circumferential part toward the busbar, and the extension part is in contact with the inner circumferential surface of the busbar and a lateral surface of the guide.

The extension part and the guide are provided as a plurality of extension parts and a plurality of guides and the extension parts and the guides are alternately disposed along a circumference of the busbar.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, exemplary embodiments of the present invention will be described in detail with reference to the accompanying drawings. Purposes, specific advantages, and novel features of the invention should become clear from exemplary embodiments and the following detailed descriptions in connection with the accompanying drawing. Moreover, terms and words used in this specification and claims are not to be interpreted as being limited to commonly used meanings or meanings in dictionaries and should be interpreted as having meanings and concepts which are consistent with the technological scope of the invention based on the principle that the inventors have appropriately defined concepts of the terms in order to describe the invention in the best way. In the description of the invention, when it is determined that detailed descriptions of related well-known functions and configurations unnecessarily obscure the gist of the invention, the detailed descriptions thereof will be omitted.

When a busbar is moved due to vibration, a coil wound around a stator moves while being connected to a terminal of the busbar, and thus a coating of the coil is peeled due to friction or is cut in severe cases. To fundamentally solve such problems, a motor according to one embodiment of the present invention is a device invented to increase a fixing force of a bus.

Hereinafter, a motor according to one embodiment of the present invention will be described in detail with reference to the accompanying drawings.

Figure 1:
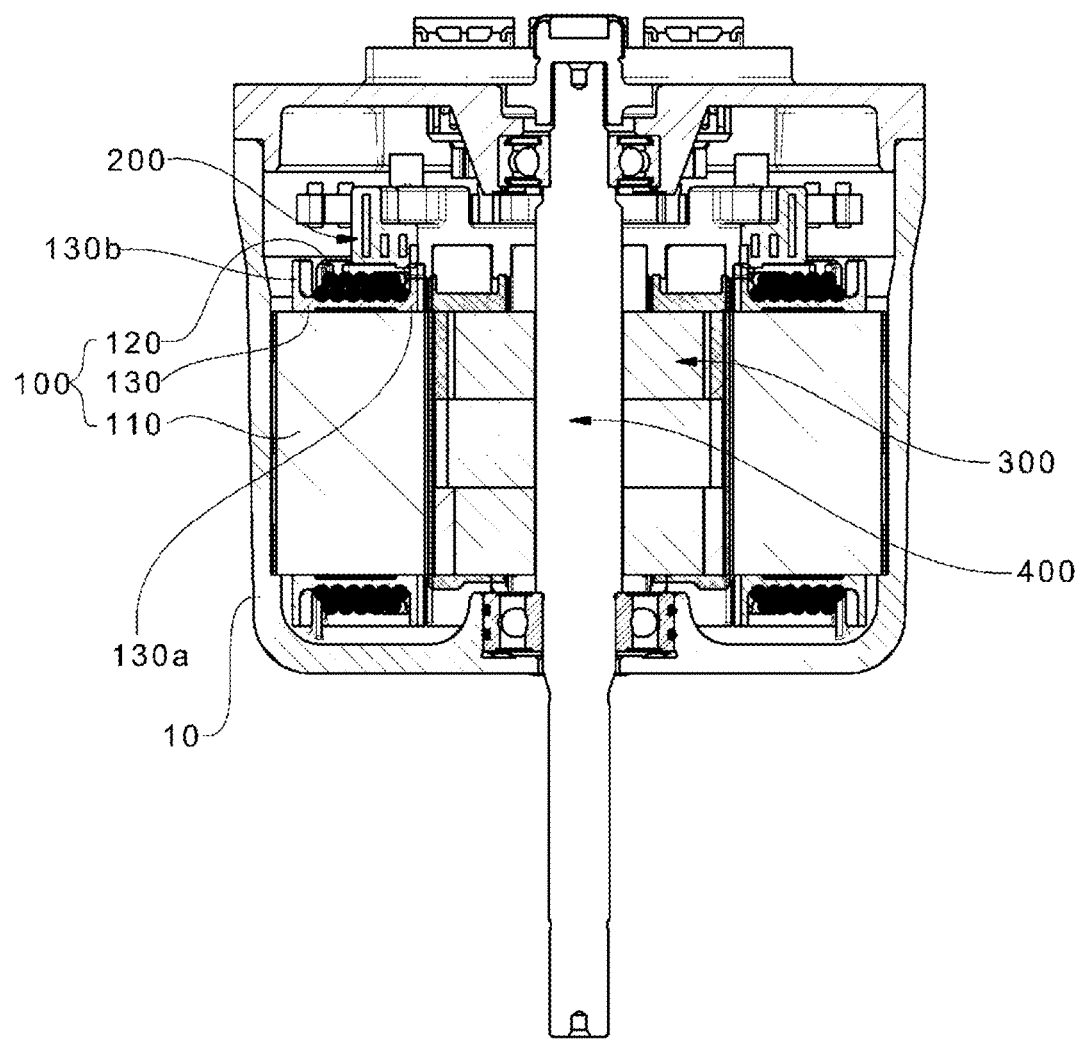
FIG. 1 is a view illustrating a motor according to one embodiment of the present invention.

FIG. 1 is a view illustrating a motor according to one exemplary embodiment of the present invention.

Referring to FIG. 1, the motor according to one exemplary embodiment of the present invention may include a stator 100, a busbar 200, a rotor 300, and a shaft 400.

The stator 100 is coupled to a housing 10, and the rotor 300 is disposed inside the stator 100. The shaft 400 may be coupled to a center portion of the rotor 300. Coils 120 are wound around the stator 100 to have a magnetic pole. The rotor 300 is rotated by a magnetic field formed by the winding of the coils 120, and the shaft 400 is rotated at the same time.

The stator 100 may include a plurality of stator cores 110. In one embodiment, the stator cores 110 may be formed by stacking a plurality of steel plates which each include a ring-shaped yoke and stator teeth disposed in a circumferential direction and protruding from the yoke toward an inner side in a diameter direction at regular angles. The coils 120 that form a rotating magnetic field may be wound around the stator teeth. In this case, the coils 120 may be insulated by insulators (130: a first insulator 130A, a second insulator 130B)

Each of the insulators 130 may be coupled to upper and lower sides of the stator cores 110 and insulate so that a current does not flow from the coils 120 wound around the stator teeth to the stator cores 110. The insulators 130 may be formed of a resin material.

An inner circumferential part 130a and an inner circumferential part 130b are respectively provided on an outer circumferential surface side and an inner circumferential surface side of the insulator 130 to inhibit the coils 120 from being detached and guide a winding position thereof.

The busbar 200 may be provided on the stator 100. The busbar 200, which connects the coils 120 disposed in parallel, is electrically connected to the coils 120. A ring-shaped body 210 made of an insulating material is provided on the busbar 200, and terminals 220 connected to the coils 120 are provided on the body. The busbar 200 is connected to the terminals 220 and may supply power to the coils 120 through power terminals receiving external power of mutually different poles.

The rotor 300 is disposed inside the stator 100. The rotor 300 may include a rotor core and a magnet coupled to each other. Optionally, the rotor core and the magnet may be integrally formed. Also, the rotor 300 may be formed as a type of rotor in which a magnet is coupled to an outer circumferential surface of a rotor core or a type of rotor in which a magnet may be inserted into a pocket of a rotor core. A sensing magnet that obtains position information of the rotor 300 is coupled to a plate and is installed on the rotor 300, or a rotor position sensing unit similar to the sensing magnet may be installed.

Both ends of the shaft 400 may be rotatably supported by a bearing.

Hereinafter, a configuration in which the insulators 130 support the busbar 200 to inhibit the busbar 200 from moving will be described with reference to the drawing.

The motor according to one exemplary embodiment of the present invention increases a coupling force between the busbar 200 and the insulators 130 through extension part s 131 and 132. The extension part s 131 and 132 are in contact with an inner circumferential surface of the busbar 200 and inhibit the busbar 200 from being moved due to vibration.

In the description of the extension part s, two types of the extension part s 131 and 132 will be described as examples according to a coupling structure thereof with the busbar 200.

The Extension Part 131 According to a First Modified Example

Figure 2:
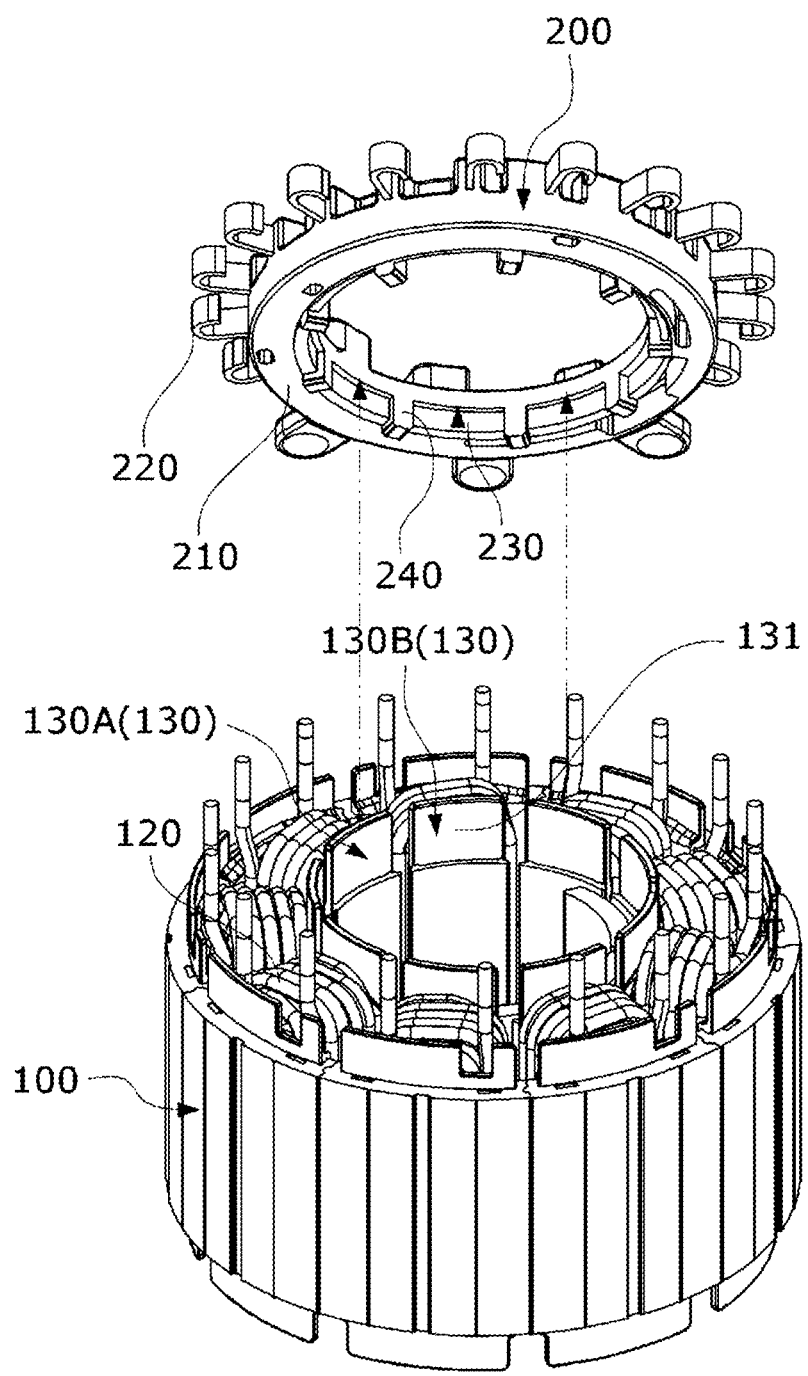
FIG. 2 is a view illustrating a extension part and a guide according to a first modified example.
Figure 3:
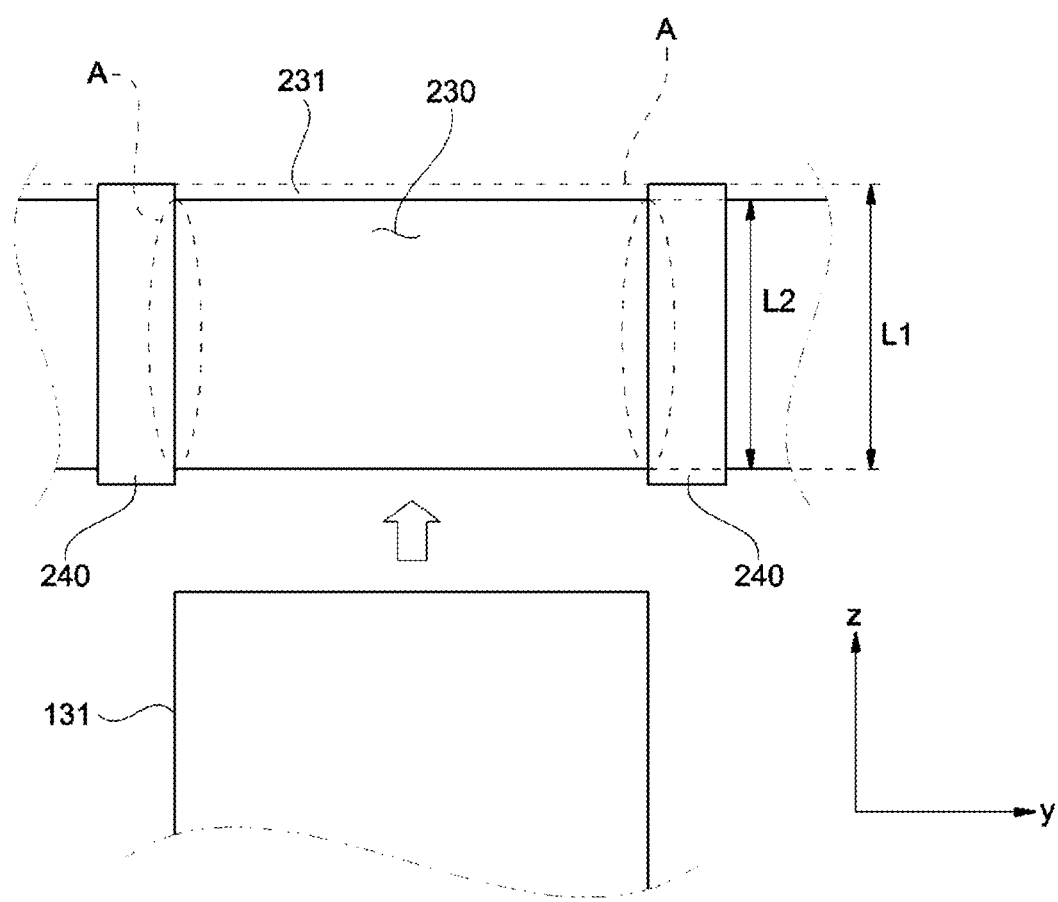
FIG. 3 is a cross-sectional view illustrating a contact state of the extension part and the guide shown in FIG. 2.
Figure 4:
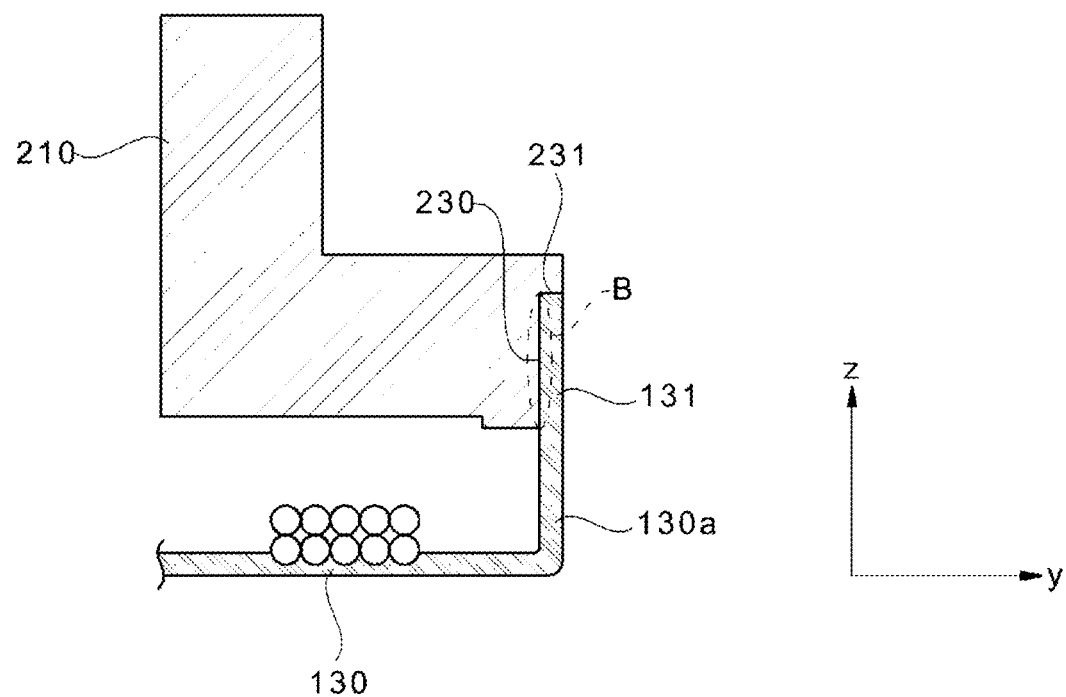
FIG. 4 is a view illustrating a state in which the extension part shown in FIG. 2 is forcibly inserted into the slot.

FIG. 2 is a view illustrating a extension part and a guide according to a first modified example, FIG. 3 is a cross-sectional view illustrating a contact state of the extension part and the guide shown in FIG. 2, and FIG. 4 is a view illustrating a state in which the extension part shown in FIG. 2 is forcibly inserted into the slot. In FIGS. 2 to 4, only specified parts are shown for a conceptually clear understanding of a configuration relation of the invention. Accordingly, the drawings may be modified in various forms and may not be significantly limited to a specific form illustrated in the drawings.

Referring to FIGS. 2 to 4, the extension part 131 may have a plate shape extending upward from the inner circumferential part 130a of the insulator 130. The extension part 131 may be formed in a curved plate shape like the inner circumferential part 130a of the insulator 130 so that an outer circumferential surface thereof is in contact with the inner circumferential surface of the insulator 130. The extension part 131 may be disposed on an upper surface of the inner circumferential part of each of the insulators 130.

While the extension part 131 may be described as being distinguished from the inner circumferential part 130a of the insulator 130 depending on a shape and functional performance thereof, the extension part 131 and the inner circumferential part 130a may be one vertically connected unit.

Meanwhile, a slot 230 into which the extension part 131 is inserted may be formed in an inner circumferential surface of the body 210 of the busbar 200. Referring to FIG. 3, the extension part 131 may be forcibly inserted into the slot 230 in a height direction thereof, i.e., a z-axis direction of FIG. 3 (a y-axis of FIG. 3 is a radial direction of the motor), along guide units 240 disposed on both sides of the slot 230. Sides of the extension part 131 are in contact with and rub sides of the guide units 240 in areas A shown in FIG. 3. Thus, the busbar 200, which is vulnerable to a fixing force, may be strongly fixed by the insulators 130 without being shaken due to vibration. A length L1 of the guide 240 in an axial direction may be greater than a length L2 a region of the extension part 131 which is in contact with the inner circumferential surface of the busbar 200 in an axial direction.

Referring to FIG. 4, the outer circumferential surface of the extension part 131 is in contact with the inner circumferential surface of the busbar 200 provided with the slots 230 and is inserted into the slots 230, and is in contact with and rubs an area B shown in FIG. 4. Thus, the busbar 200 may be more strongly fixed by contact surfaces between the extension part 131 and the guide units 240 and contact surfaces between the slots 230 and the extension part 131.

The guide units 240 protrude inward from the inner circumferential surface of the busbar 200 to divide the slots 230. The guide units 240 may be disposed in a circumferential direction at regular intervals. Positions of the guide units 240 may be determined to correspond to positions of the insulators 130.

The extension part 131 and the guide 240 are provided as a plurality of extension parts 131 and a plurality of guides 240 and the extension parts 131 and the guides 240 are alternately disposed along a circumference of the busbar 200. A position of the busbar 200 is determined due to the extension part 131 in contact with the lateral surface of the guide 240.

Meanwhile, a stepped portion 231 may be formed in an area forming an upper edge of the slot 230. The stepped portion 231 connects the plurality of guides 240. The stepped portion 231 protrudes inward from an upper end of the inner circumferential surface of the busbar 200 and is in contact with an upper surface of the extension part 131. In this case, a stepped surface of the stepped portion 231 may be horizontally formed, and correspondingly, the upper surface of the extension part 131 may also be horizontally formed.

The Extension Part 132 According to a Second Modified Example

Hereinafter, the extension part 132 according to a second modified example will be described with reference to the drawing on the basis of a difference with the extension part 131 according to the first modified example.

Figure 5:
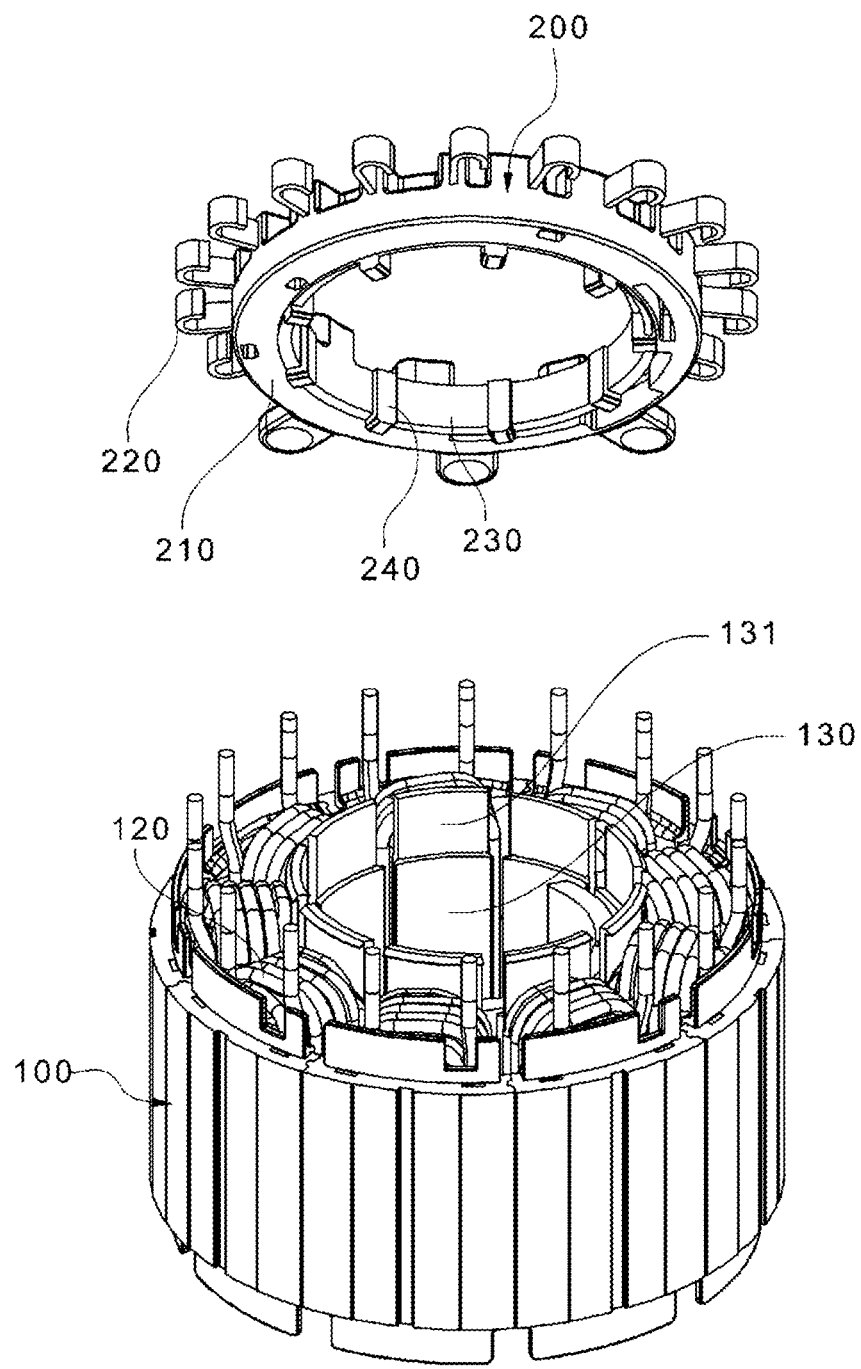
FIG. 5 is a view illustrating a extension part and a guide according to a second modified example.
Figure 6:
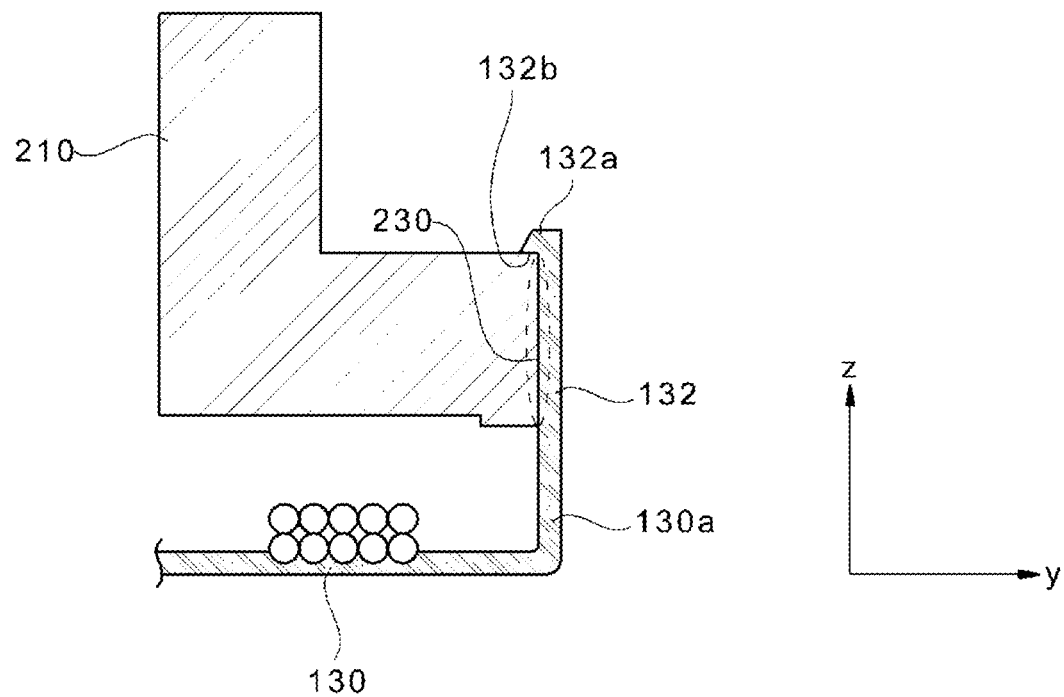
FIG. 6 is a cross-sectional view illustrating a coupling state of the extension part and the slot shown in FIG. 5.

FIG. 5 is a view illustrating a extension part and a guide according to a second modified example, and FIG. 6 is a cross-sectional view illustrating a coupling state of the extension part and the slot shown in FIG. 5. In FIGS. 5 and 6, only specified parts are shown for a conceptually clear understanding of the configuration relation of the invention. Accordingly, the drawing may be modified in various forms and may not be significantly limited to a specific form illustrated in the drawings.

Referring to FIGS. 5 and 6, a hook 132a may be formed on an upper end of the extension part 132. The hook 132a may protrude inward from the upper end of the extension part 132 toward the center of the motor to form a blocking surface 132b. A slot 230 may be formed to pass from a lower end of the inner circumferential surface of the busbar 200 to the upper end thereof.

When the hook 132a of the extension part 132 is inserted into the slot 230 up to the upper end of the inner circumferential surface of the the busbar 200, the blocking surface 132b of the hook 132a presses the upper end of the inner circumferential surface of the busbar 200 to inhibit the busbar from being moved by vibration.

Figure 7:
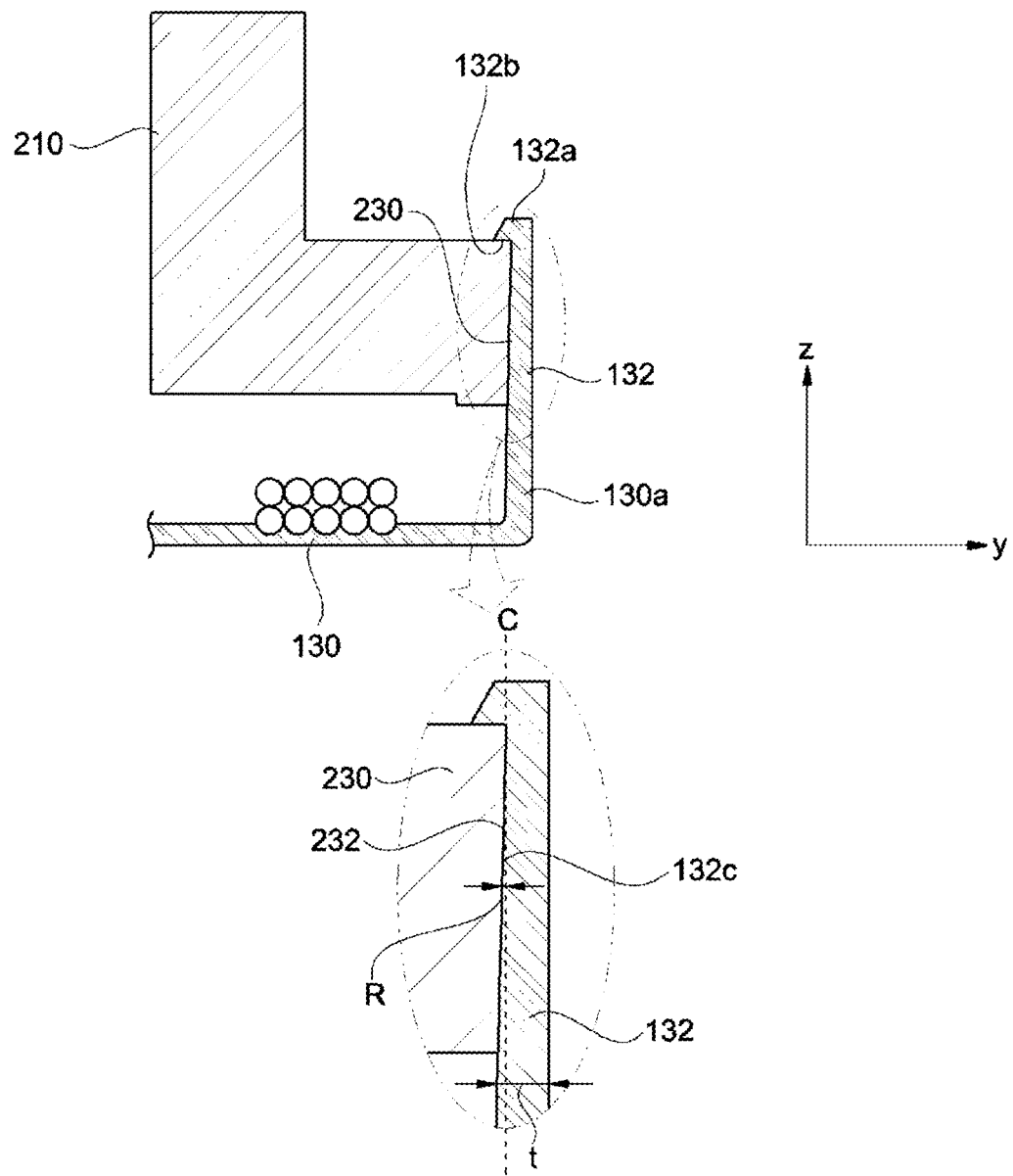
FIG. 7 is a view illustrating a modified example of a extension part.

FIG. 7 is a view illustrating a modified example of the extension part.

Referring to FIG. 7, a contact surface 232 of a slot 230 may be formed to be inclined by a predetermined angle R from a reference line CL formed in a z-axis direction of FIG. 7. That is, the slot 230 may be formed to be inclined toward the center of the body 210 from a y-axis direction. Correspondingly, a side 132c of the extension part 132 may also be formed to be inclined. The extension part 132 has a thickness(t) that decreases in a direction toward an upper side thereof. The above structure is for securing workability for an assembly of the slot 230 and the extension part 132 in consideration of the body 210 of the busbar 200 disposed above the insulators 130.

According to one embodiment of the present invention, a extension part connected with an inner circumferential part of an insulator supports an inner circumferential surface of a guide of a busbar, and thus a motor can inhibit the busbar from moving without an additional process or component to inhibit a coating of a coil from being worn or cut.

Also, according to one embodiment of the present invention, a extension part a motor can more stably inhibit the busbar from moving with a simple assembly process.

As described above, the motor according to one exemplary embodiment of the present invention has been described in detail with reference to the exemplary embodiments.

While the present invention has been particularly described with reference to the exemplary embodiments, it should be understood by those of skilled in the art that various changes, modifications, and replacements may be made without departing from the spirit and scope of the present invention. Therefore, the exemplary embodiments and accompanying drawings should be considered in a descriptive sense only and not for purposes of limitation. Accordingly, the scope of the invention is not limited by the embodiments and accompanying drawings. The scope of the invention is defined not by the detailed description of the invention but by the appended claims, and encompasses all modifications and equivalents that fall within the scope of the appended claims.

DESCRIPTION OF SYMBOLS

100: STATOR
110: STATOR COIL
120: COIL
130: INSULATOR
130a: INNER CIRCUMFERENTIAL PART
130b: OUTER CIRCUMFERENTIAL PART
131,132: EXTENSION PARTS
132a: HOOK
132b: BLOCKING SURFACE
200: BUSBAR
210: BODY
220: TERMINAL
230: SLOT
240: GUIDE UNIT
300: ROTOR
400: SHAFT

What is claimed is:
1. A motor comprising:
a housing;
a stator disposed in the housing;
a rotor disposed in the stator; and
a busbar disposed on one side of the stator,
wherein the stator includes:
a stator core;
a coil wound around the stator core; and
an insulator disposed between the stator core and the coil,
wherein the insulator includes:
a first insulator; and
a second insulator; and
wherein the busbar includes a plurality of guides,
wherein each of the first and second insulators comprises
an extension part that protrudes from an inner circum- ferential part of the corresponding insulator facing the rotor toward the busbar, and wherein the extension parts and the guides are alternately disposed along a circumference of the busbar.

2. The motor of claim 1, wherein the guide is provided as a plurality of guides, and each guide of the plurality of guides is disposed between a first insulator and a second insulator.

3. The motor of claim 1, wherein the busbar includes a slot that is disposed adjacent to the guide, and an upper end of the insulator is disposed in the slot.

4. The motor of claim 1, herein an upper end of the insulator is in contact with a side surface of the guide.

5. The motor of claim 1, wherein a length of the guide in an axial direction is greater than a length of a region of an upper end of the insulator that is in contact with an inner circumferential surface of the busbar in an axial direction.

6. The motor of claim 1, wherein the busbar includes a short protrusion that protrudes from an inner circumferential surface of the busbar to connect a plurality of guides; and the short protrusion is in contact with an upper surface of the insulator.

7. The motor of claim 1, wherein a position of the busbar is determined by an upper surface of the insulator being in contact with a lateral surface of the guide.

8. The motor of claim 1, wherein each of the first and second insulators includes:

an outer circumferential part that faces the housing; and wherein each extension part is in contact with an inner circumferential surface of the busbar.

9. The motor of claim 1, wherein when each of the extension parts is inserted into a space between the adjacent guides, and wherein a first outer lateral surface of any of the extension parts comes in direct contact with a first inner lateral surface of a first adjacent guide and a second outer lateral surface of the same extension part comes in direct contact with a second inner lateral surface of a second adjacent guide.

* * * * *